(12) United States Patent
Muto et al.

(10) Patent No.: US 8,933,579 B2
(45) Date of Patent: Jan. 13, 2015

(54) MANUFACTURING METHOD AND VEHICLE

(75) Inventors: Kazuhiro Muto, Chiba (JP); Hiroaki Murase, Tokyo (JP)

(73) Assignees: The Japan Research Institute, Limited, Tokyo (JP); ITOCHU Corporation, Osaka (JP)

(*) Notice: Subject to any disclaimer, the term of this patent is extended or adjusted under 35 U.S.C. 154(b) by 783 days.

(21) Appl. No.: 13/239,395

(22) Filed: Sep. 22, 2011

(65) Prior Publication Data

US 2012/0013179 A1    Jan. 19, 2012

Related U.S. Application Data

(63) Continuation of application No. PCT/JP2010/002144, filed on Mar. 25, 2010.

(30) Foreign Application Priority Data

Mar. 27, 2009   (JP) .................................. 2009-080599

(51) Int. Cl.
*B60L 1/00* (2006.01)
*B60L 11/18* (2006.01)
*H01M 2/10* (2006.01)

(52) U.S. Cl.
CPC ......... *B60L 11/1853* (2013.01); *B60L 11/1864* (2013.01); *H01M 2/1077* (2013.01); *B60L 2200/22* (2013.01); *Y02T 10/7005* (2013.01); *Y02T 10/7061* (2013.01)
USPC .......................................... 307/9.1; 307/150

(58) Field of Classification Search
CPC ............ H01M 2/1072; H01M 2/1083; H01M 2220/10; B60L 2200/22
USPC .............. 429/99, 121, 177; 903/907; 307/9.1, 307/10.1, 150, 147
See application file for complete search history.

(56) References Cited

U.S. PATENT DOCUMENTS

| | | | | |
|---|---|---|---|---|
| 3,339,169 A | * | 8/1967 | Freeland | 439/55 |
| 5,343,974 A | * | 9/1994 | Rabek | 180/216 |
| 5,709,280 A | * | 1/1998 | Beckley et al. | 180/68.5 |
| 5,853,058 A | * | 12/1998 | Endo et al. | 180/65.1 |
| 6,442,494 B1 | * | 8/2002 | Baalu et al. | 702/63 |
| 8,709,643 B2 | * | 4/2014 | Yoon | 429/160 |
| 2002/0022159 A1 | * | 2/2002 | Pierson et al. | 429/1 |
| 2009/0145676 A1 | * | 6/2009 | Takasaki et al. | 180/65.1 |
| 2011/0171505 A1 | * | 7/2011 | Kishll et al. | 429/82 |
| 2012/0114997 A1 | * | 5/2012 | Chen et al. | 429/99 |
| 2013/0037336 A1 | * | 2/2013 | Ojeda et al. | 180/68.5 |
| 2013/0115497 A1 | * | 5/2013 | Ertel | 429/99 |

FOREIGN PATENT DOCUMENTS

| | | | |
|---|---|---|---|
| JP | 04285405 A | * | 10/1992 |
| JP | H05-207664 A | | 8/1993 |
| JP | 5820267 B2 | * | 5/2013 |

OTHER PUBLICATIONS

Machine translation for JP5820267B2.*

* cited by examiner

*Primary Examiner* — Fritz M Fleming

(57) ABSTRACT

A manufacturing method of a vehicle, includes: preparing a chassis of the vehicle in which a plurality of battery modules are installed; forming a wiring section in a body of the vehicle; and electrically connecting the plurality of battery modules by means of the wiring section, by coupling the chassis to the body.

6 Claims, 6 Drawing Sheets

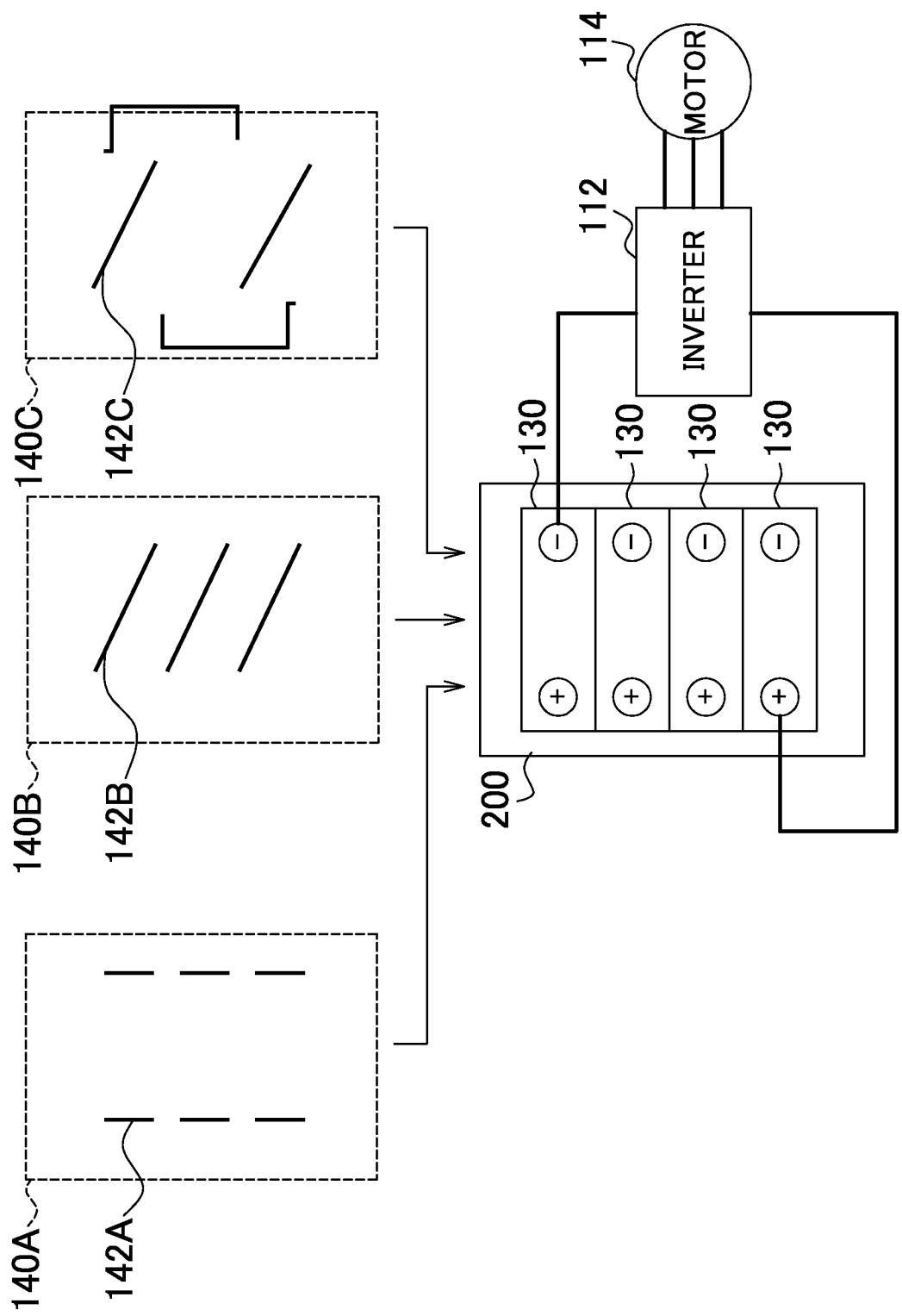
F I G . 2

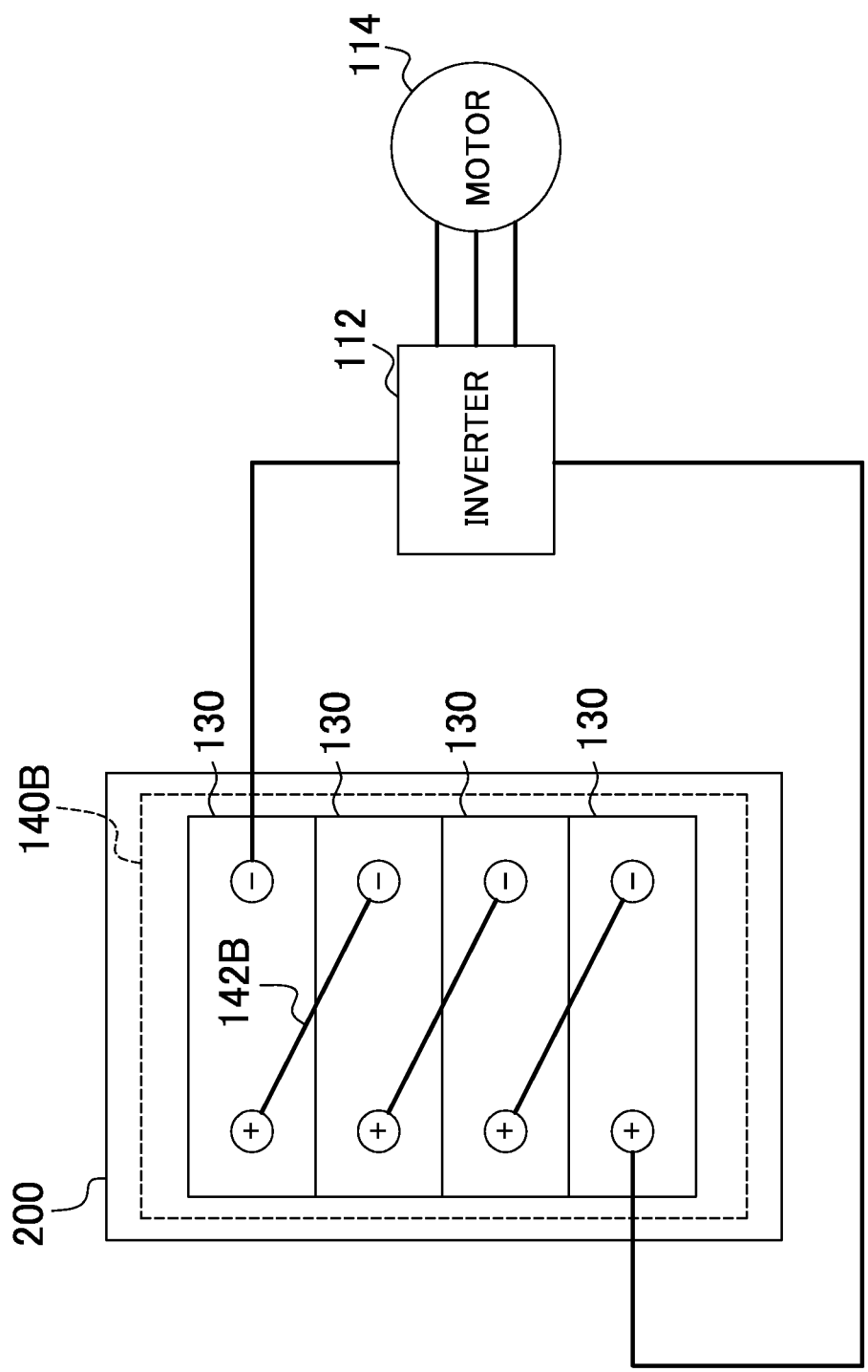
F I G . 5

MANUFACTURING METHOD AND VEHICLE

The contents of the following International patent application are incorporated herein by reference:

International Patent Application NO. PCT/JP2010/002144 filed on Mar. 25, 2010.

BACKGROUND

1. Technical Field

The present invention relates to a manufacturing method and a vehicle.

2. Related Art

Patent Document No. 1 describes an electric car with a motor-driving battery.

Patent Document No. 1: Japanese Patent Application Publication No. H05-207664

SUMMARY

In the prior art, when there is change in the usage of an electric car, the configuration of the battery pack is also required to be changed, to correspond to the amount of power of the electric energy required by the new electric car. In this case, the formerly used battery pack becomes unnecessary, and so has to be abandoned even if it is still usable. In this way, the prior art cannot make full use of the battery packs for electric cars.

Therefore, according to a first aspect of the innovations herein, provided is a manufacturing method of a vehicle, including: preparing a chassis of the vehicle in which a plurality of battery modules have been installed; forming a wiring section in a body of the vehicle; and electrically connecting the plurality of battery modules by means of the wiring section, by coupling the chassis to the body.

The manufacturing method may further include determining a connection form of the plurality of battery modules, where the process of forming the wiring section includes: forming the wiring section in the body based on the determined connection form.

In the manufacturing method, the process of determining the connection form may include: determining the connection form of the plurality of battery modules based on a type of the body.

In the manufacturing method, the process of determining the connection form, may include: determining the connection form of the plurality of battery modules based on a voltage required by the vehicle.

The manufacturing method may further include obtaining characteristics of the plurality of battery modules, where the process of determining the connection form includes: determining the connection form of the plurality of battery modules based on the obtained characteristics.

According to a second aspect of the innovations herein, provided is a vehicle including: a chassis; a plurality of battery modules installed in the chassis; a body; and a wiring section that is formed in the body and electrically connects the plurality of battery modules when the body is connected to the chassis.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 2 shows a conceptual view of a manufacturing method of an electric car.

FIG. 5 shows an exemplary battery pack 200 when a plurality of battery modules 130 are in electrical connection.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
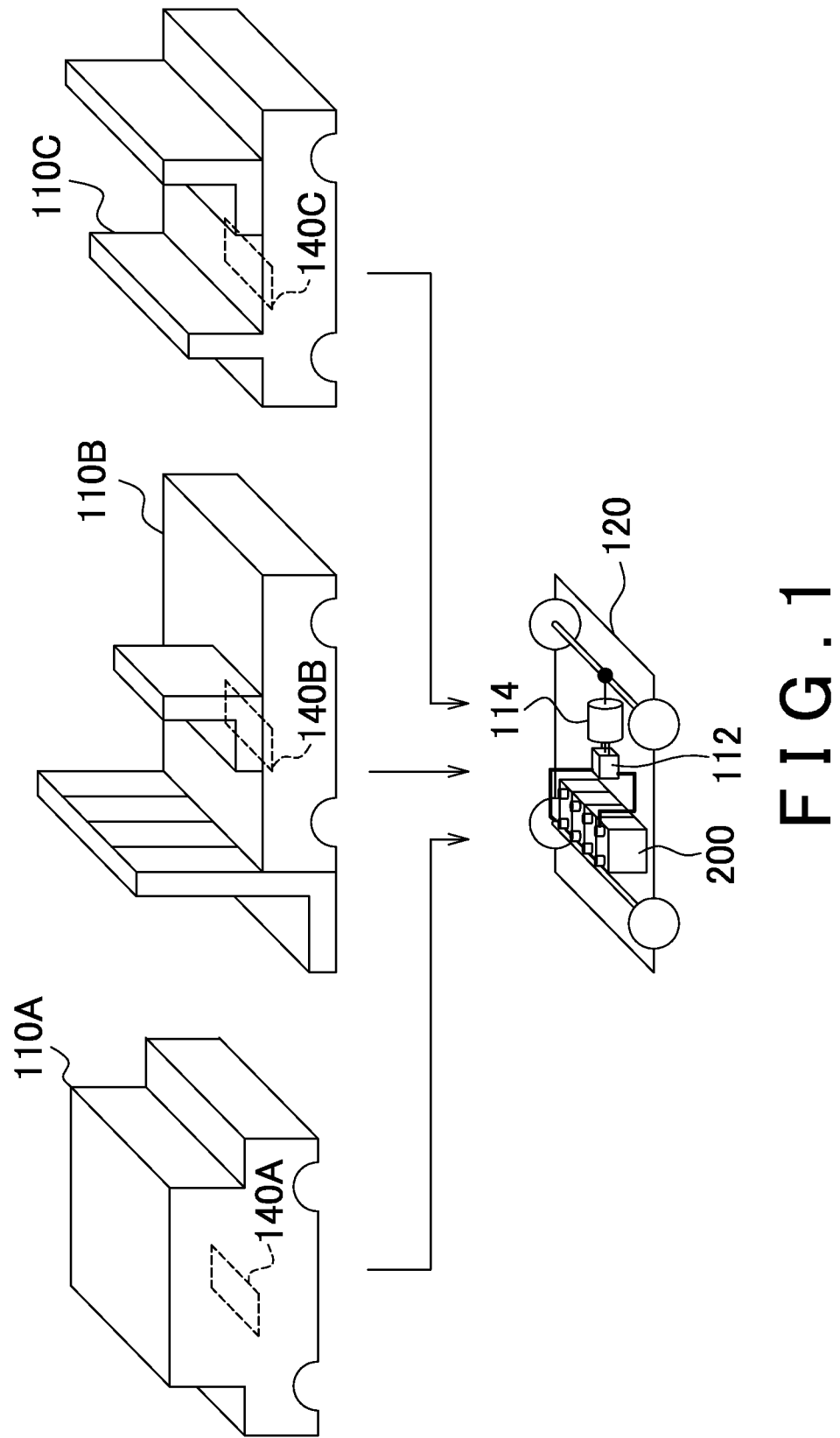
FIG. 1 shows a conceptual view of a manufacturing method of an electric car.

FIG. 1 and FIG. 2 show a conceptual view of a manufacturing method of an electric car. The following shows an exemplary manufacturing method of an electric car as an example of a vehicle.

A chassis 120 and a body 110 are prepared first. The chassis 120 is provided with a battery pack 200, an inverter 112, and a motor 114. The battery pack 200 includes a plurality of batter modules 130. The inverter 112 converts the current of the electric energy supplied from the battery pack 200, from direct current to alternate current. The inverter 112 supplies the converted alternate current to the motor 114. The motor 114 drives the wheel of the electric car.

A wiring section 140 for electrically connecting the plurality of battery modules 130 are formed on the body 110. Specifically, the body 110 is provided with the wiring section 140 at the position to be in contact with the plurality of terminals provided for the chassis 120 when connected to the chassis 120.

Then, the body 110 is coupled with the chassis 120. By coupling the body 110 to the chassis 120, the plurality of terminals provided for the chassis 120 are brought in contact with the wirings 142 of the wiring section 140 provided for the body 110. As a result, the plurality of battery modules 130 are in electrical connection by means of the wiring section 140. According to the electrical connection of the plurality of battery modules 130, the battery pack 200 can supply an electric energy.

The electric car manufactured by the above-explained manufacturing method will comprise the chassis 120, the plurality of battery modules 130 installed in the chassis 120, the body 110, and the wiring section 140 formed in the body 110 to electrically connect the plurality of battery modules 130 when the body 110 is connected to the chassis 120.

A plurality of types of bodies 110 can be coupled to the chassis 120. For example as FIG. 1 shows, a body 110A of a passenger car, a body 110B of a forklift, and a body 110C of a golf cart can be connected to the chassis 120 respectively.

The user of the electric car may use the electric car for many purposes by changing the body 110 to be coupled to the chassis 120 depending on the reliability of the battery pack 200. For example, when the reliability of the battery pack 200 is high, the body 110A can be coupled to the chassis 120 to use the electric car as a passenger car. When the reliability of the battery pack 200 is decreased, the body 110C can be coupled to the chassis 120, to use the electric car as a golf cart. When the reliability of the battery pack 200 is further decreased, the body 110B can be coupled to the chassis 120, to use the electric car as a forklift.

As shown in FIG. 2, the wiring section 140 is provided with the wirings 142 for supplying electric energy in accordance with the usage of the body 110. For example, the wiring section 140A provided for the body 110A is provided with the wirings 142A for supplying electric energy in accordance with a passenger car. The wiring section 140B provided for the body 110B is provided with the wirings 142B for supplying electric energy in accordance with a forklift. The wiring section 140C provided for the body 110C is provided with the wirings 142C for supplying electric energy in accordance with a golf cart.

Figure 3:
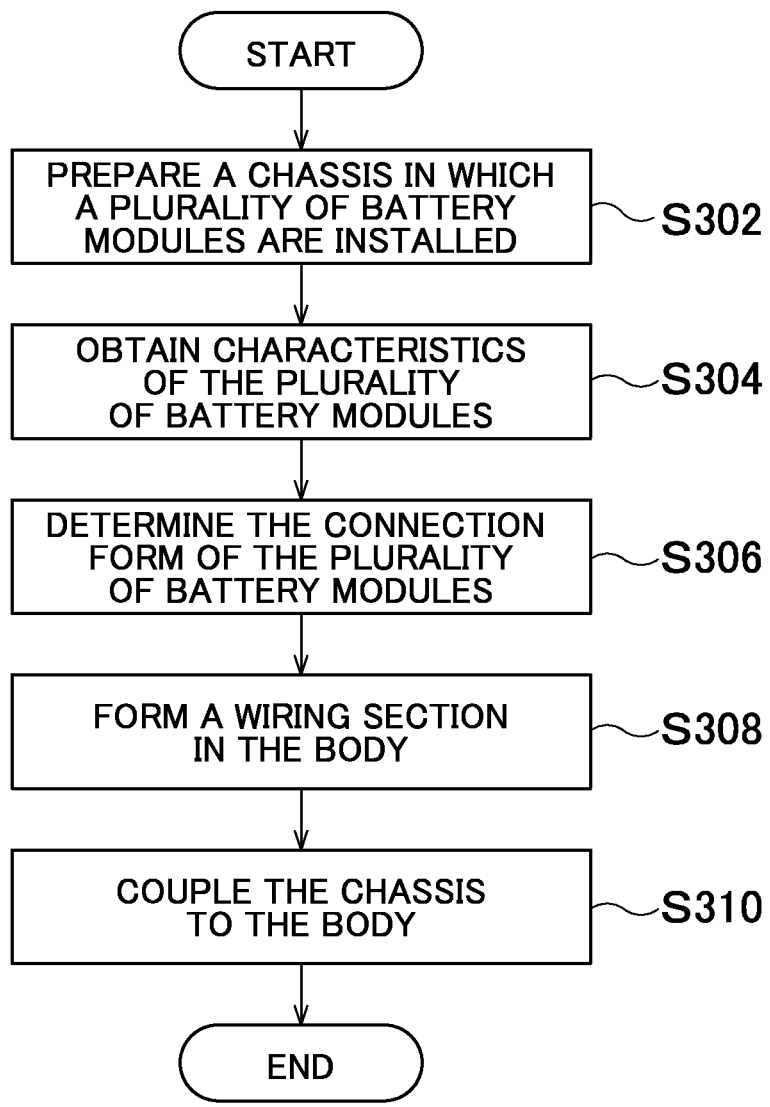
FIG. 3 shows an exemplary manufacturing process of an electric car.

FIG. 3 shows an exemplary manufacturing process of an electric car. It is assumed that the battery module installing process for installing a plurality of battery modules 130 in a chassis 120 of an electric car has been completed in advance prior to conducting the following-explained manufacturing process.

First, in the chassis preparing process, the chassis 120 of an electric car in which the plurality of battery modules 130 have been installed is prepared (S302).

Next, in the battery module characteristics obtaining process, the characteristics of the plurality of battery modules 130 are obtained (S304). For example in the battery module characteristics obtaining process, the amount of power that can be supplied by the battery module 130 is obtained as the characteristics of the battery module 130. In the battery module characteristics obtaining process, the characteristics of the plurality of battery modules 130 can be obtained for each battery module 130.

In the battery module characteristics obtaining process, the degree of deterioration of the battery modules 130 can be obtained as the characteristics of the battery modules 130. Some examples of the degree of deterioration of the battery modules 130 obtained in the battery module characteristics obtaining process are the internal resistance value, the temperature, the voltage at the full charge, the number of times of charge/discharge, the voltage at the charging start, the charging characteristics, the discharging characteristics, the number of times of excessive charge, the number of times of excessive discharge of the battery modules 130. The characteristics of the battery modules 130 may be obtained from a memory storing therein the characteristics, in the battery module characteristics obtaining process. The characteristics of the battery modules 130 may also be obtained from a measuring apparatus measuring the characteristics, in the battery module characteristics obtaining process.

Next, in the connection form determining process, the connection form of the plurality of battery modules 130 is determined (S306). Some examples of the connection form of the plurality of battery modules 130 determined in the connection form determining process are parallel connection, serial connection, the combination of battery modules 130 to be connected, and the order of the connection.

In the connection form determining process, the connection form of the plurality of battery modules 130 may be determined based on the type of the body 110 coupled to the chassis 120. For example, the connection form of the plurality of battery modules 130 may be determined based on the voltage required by the electric car, in the connection form determining process.

In the connection form determining process, the connection form of the plurality of battery modules 130 may be determined based on the characteristics of the plurality of battery modules 130 obtained in S304. For example, the connection form of the plurality of battery modules 130 may be determined so that the battery pack 200 can supply the electric energy corresponding to the characteristics required by the electric car. For example, the connection form of the plurality of battery modules 130 may be determined so that the battery pack 200 can supply the electric energy in the amount of power required by the electric car.

Moreover, in the connection form determining process, the type of the body 110 to be coupled to the chassis 120 may be determined based on the characteristics of the plurality of battery modules 130 obtained in S304. For example, based on the characteristics of the plurality of battery modules 130 obtained in S304, a body 110 suited for the use of the electric energy corresponding to the particular characteristics can be determined as the body 110 to be coupled to the chassis 120. For example, based on the amount of power of the plurality of battery modules 130 obtained in S304, a body 110 suited for the use of the electric energy in the particular amount of power can be determined as the body 110 to be coupled to the chassis 120.

Next, in the wiring section forming process, the wiring section 140 is formed in the body of an electric car (S308). Specifically during the wiring section forming process, the wiring section 140 is formed in the body 110, based on the connection form determined in S306. Then, in the battery module connecting process, the chassis 120 is coupled to the body 110, thereby electrically connecting the plurality of battery modules 130 by means of the wiring section 140 (S310).

Figure 4:
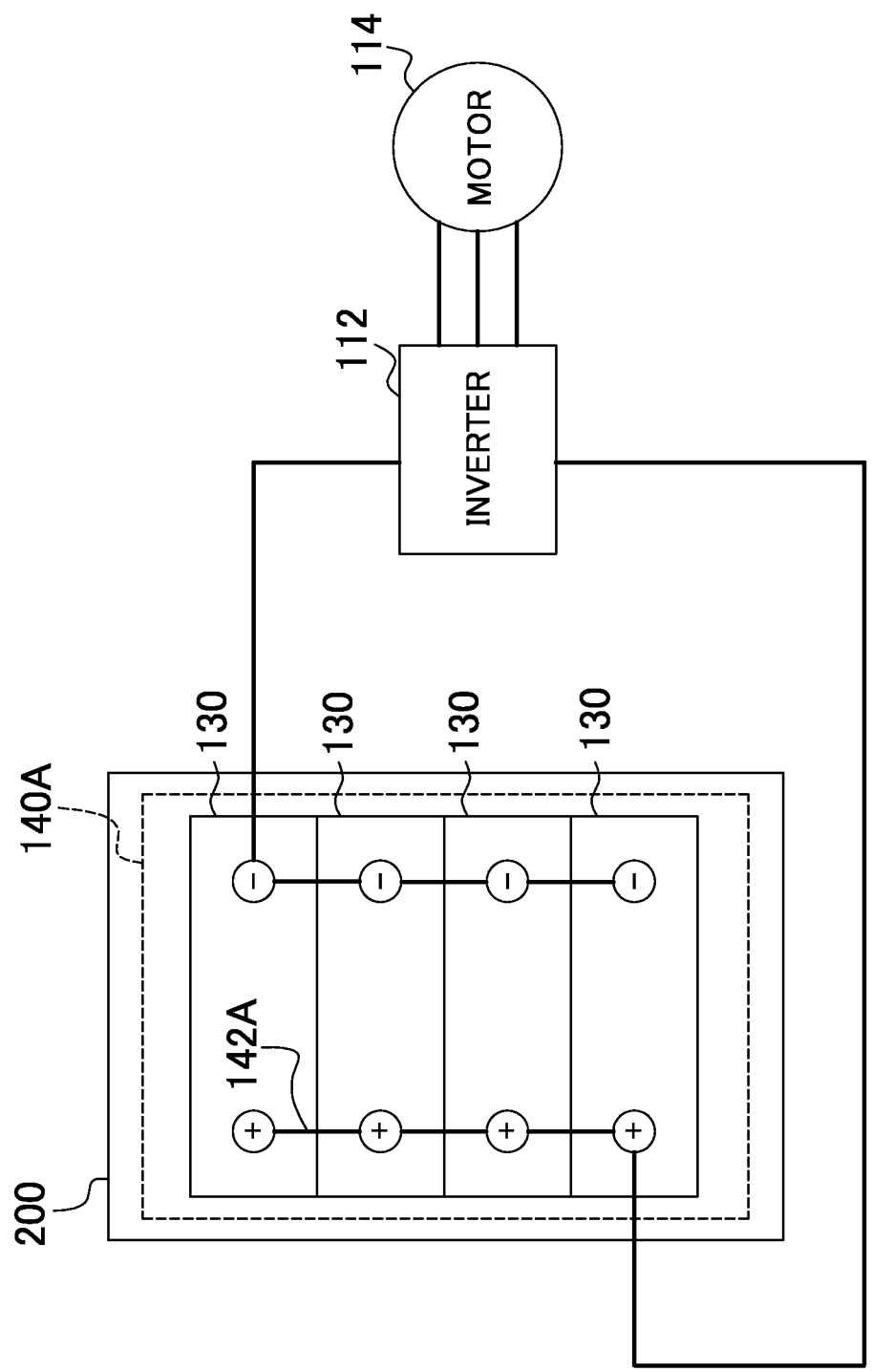
FIG. 4 shows an exemplary battery pack 200 when a plurality of battery modules 130 are in electrical connection.
Figure 6:
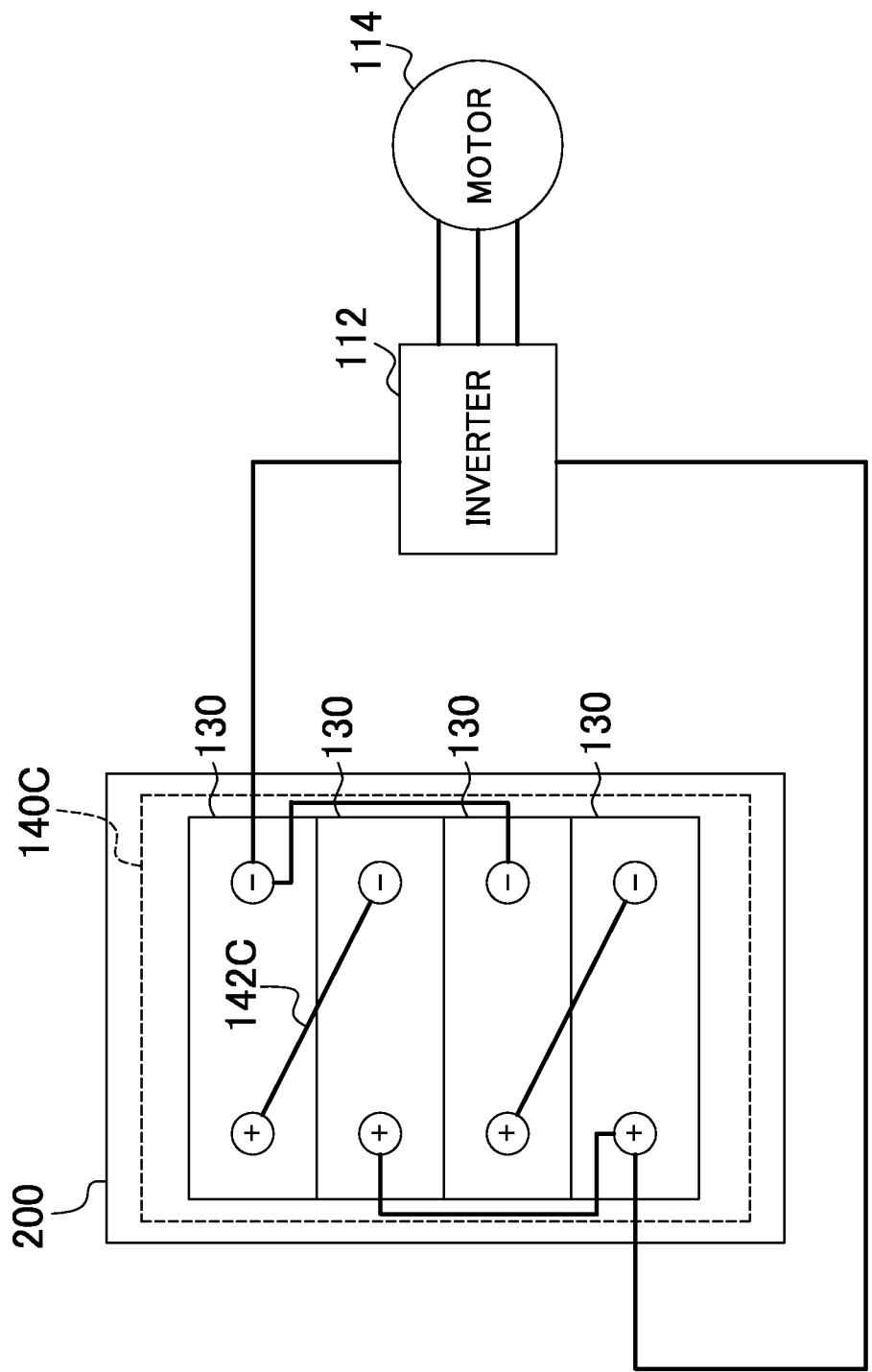
FIG. 6 shows an exemplary battery pack 200 when a plurality of battery modules 130 are in electrical connection.

FIG. 4, FIG. 5, and FIG. 6 respectively show an exemplary battery pack 200 when a plurality of battery modules 130 are in electrical connection. FIG. 4 shows an exemplary battery pack 200 when the body 110A of a passenger car is coupled to the chassis 120. In the battery pack 200 shown in the example of FIG. 4, the plurality of battery modules 130 are in electrical connection by means of the wirings 142A of the wiring section 140A provided for the body 110A. Specifically, the plurality of battery modules 130 are in parallel electrical connection by means of the wirings 142A. As a result, the battery pack 200 can supply the electric energy in the voltage in accordance with a passenger car.

FIG. 5 shows an exemplary battery pack 200 when the body 110B of a forklift is coupled to the chassis 120. In the battery pack 200 shown in the example of FIG. 5, the plurality of battery modules 130 are in electrical connection by means of the wirings 142B of the wiring section 140B provided for the body 110B. Specifically, the plurality of battery modules 130 are in serial electrical connection by means of the wirings 142B. As a result, the battery pack 200 can supply the electric energy in the voltage in accordance with a forklift.

FIG. 6 shows an exemplary battery pack 200 when the body 110C of a golf cart is coupled to the chassis 120. In the battery pack 200 shown in the example of FIG. 6, the plurality of battery modules 130 are in electrical connection by means of the wirings 142C of the wiring section 140C provided for the body 110C. Specifically, the plurality of battery modules 130 are in serial electrical connection and the serially connected plurality of battery modules 130 are further in parallel connection, by means of the wirings 142C. As a result, the battery pack 200 can supply the electric energy in the voltage in accordance with a golf cart.

In this way, according to the manufacturing method and the electric car according to the present embodiment, the body 110 is provided with the wiring section 140. As a result, by coupling the body 110 to the chassis 120, the plurality of battery modules 130 can be electrically connected. In addition, the wiring section 140 is provided with wirings 142 that can supply an electric energy in accordance with the usage of the body 110. This allows changing the configuration of the battery pack 200 to supply an electric energy in accordance with the usage of the particular body 110 being coupled to the chassis 120.

In addition, according to the manufacturing method and the electric car according to the present embodiment, even when the usage of an electric car is changed, the battery pack 200 can continue to be used for the new electric car, without exchanging the battery pack 200. This is an effective use of the battery pack 200. Moreover, when the characteristics of the battery pack 200 are anyhow changed, the usage of the electric car can be changed instead of exchanging the battery pack 200, enabling to continue using the particular battery pack 200.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

What is claimed is:

1. A manufacturing method of a vehicle, comprising:
   preparing a chassis of the vehicle in which a plurality of battery modules have been installed;
   forming a wiring section in a body of the vehicle; and
   electrically connecting the plurality of battery modules by means of the wiring section, by coupling the chassis to the body.

2. The manufacturing method according to claim 1, further comprising:
   determining a connection form of the plurality of battery modules, wherein
   the process of forming the wiring section includes:
   forming the wiring section in the body based on the determined connection form.

3. The manufacturing method according to claim 2, wherein
   the process of determining the connection form includes:
   determining the connection form of the plurality of battery modules based on a type of the body.

4. The manufacturing method according to claim 2, wherein
   the process of determining the connection form includes:
   determining the connection form of the plurality of battery modules based on a voltage required by the vehicle.

5. The manufacturing method according to claim 2, further comprising:
   obtaining characteristics of the plurality of battery modules, wherein
   the process of determining the connection form includes:
   determining the connection form of the plurality of battery modules based on the obtained characteristics.

6. A vehicle comprising:
   a chassis;
   a plurality of battery modules installed in the chassis;
   a body; and
   a wiring section that is formed in the body and electrically connects the plurality of battery modules when the body is connected to the chassis.

* * * * *